United States Patent
Prengaman

(10) Patent No.: US 6,649,306 B2
(45) Date of Patent: Nov. 18, 2003

(54) ALLOY FOR THIN POSITIVE GRID FOR LEAD ACID BATTERIES AND METHOD FOR MANUFACTURE OF GRID

(75) Inventor: R. David Prengaman, Arlington, TX (US)

(73) Assignee: RSR Technologies, Inc., Dallas, TX (US)

( * ) Notice: Subject to any disclaimer, the term of this patent is extended or adjusted under 35 U.S.C. 154(b) by 21 days.

(21) Appl. No.: 09/747,947

(22) Filed: Dec. 26, 2000

(65) Prior Publication Data

US 2001/0009743 A1 Jul. 26, 2001

Related U.S. Application Data

(63) Continuation-in-part of application No. 09/487,491, filed on Jan. 19, 2000, now abandoned.
(51) Int. Cl.⁷ ............................. H01M 4/66; C22C 11/00
(52) U.S. Cl. ...................... 429/245; 429/233; 420/566
(58) Field of Search ............................... 429/245, 233, 429/225, 226, 209; 420/563, 566, 570, 573, 84, 564

(56) References Cited

U.S. PATENT DOCUMENTS

| | | |
|---|---|---|
| 3,953,244 A | 4/1976 | Prengaman |
| 6,351,878 B1 * | 3/2002 | Rao .............................. 29/2 |

FOREIGN PATENT DOCUMENTS

| | | |
|---|---|---|
| EP | 0 969 108 A1 | 1/2000 |
| WO | WO 00/60677 | 10/2000 |

OTHER PUBLICATIONS

Prengaman, The metallurgy and performance of cast and rolled lead alloy for battery grids, Journal of Power Sources 67 (1997) 267–278 No specific month available.
Prengaman, Lead–acid technology: a look to possible future achievements, Journal of Power Sources 78 (1999) 123–129 No month available.
Lakshmi, Structure and properties of lead–calcium–tin alloys for battery grids, Journal of Power Sources 73 (1998) 23–29 No month available.

* cited by examiner

Primary Examiner—Stephen Kalafut
Assistant Examiner—R Alejandro
(74) Attorney, Agent, or Firm—Theresa M. Gillis

(57) ABSTRACT

A lead acid battery grid made from a lead based alloy containing calcium, tin, and silver having the following composition: calcium above 0.06 and below 0.082%, tin above 1.0% and below 1.2%, silver between 0.005 and 0.020%, and optionally containing up to 0.025% aluminum. To enhance corrosion resistance and reduce grid growth, the grid optimally may contain 0.005 to 0.05% copper as an alloying element complementary to and as a replacement for part of the silver, provided the silver content does not fall below 0.005% and no more than a trace of aluminum is present.

16 Claims, No Drawings

ALLOY FOR THIN POSITIVE GRID FOR LEAD ACID BATTERIES AND METHOD FOR MANUFACTURE OF GRID

This application is a continuation-in-part of U.S. application Ser. No. 09/487,491, filed Jan. 19, 2000 now abandoned.

FIELD OF THE INVENTION

This invention relates to lead-calcium-tin-silver alloys for use in the positive grids for lead acid batteries. The alloy may be used to form thin grids by any method, including both expanded metal processing and book mold casting. Grids formed with the alloy harden rapidly, can be cured without resort to extraordinary measures and are stable and easily recyclable.

BACKGROUND OF THE INVENTION

Modern automobile starting batteries require large numbers of thin grids. Proposed 42-volt battery systems will require even more and thinner grids. Sealed VRLA batteries for electric vehicle or hybrid electric service also require thin grids for rapid recharge. Thin positive grids also have utility in stationery batteries for uninterruptible power service or telecommunications service.

Production of thin grids whether conventional book mold cast, continuously cast, concast strip followed by expansion or direct continuous cast followed by rolling, results in a handling of the grid or the strip at high temperatures. The thinner the grid, the more difficult is the grid to handle at high temperatures. Production processes try to rapidly decrease the grid temperature with air, water, or water-cooled trim dies and platens depending on the process. The reduction in temperature is important for lead-calcium alloy grids because these are generally very weak at elevated temperatures and must be cooled to lower temperatures to prevent deformation or thickness change due to inadequate hardness. Despite rapid cooling to room temperature, many grid materials produced from low calcium alloys are extremely difficult to handle due to inadequate hardness at room temperature.

Thicker grids such as those of 0.060" and above generally have more mass and are better able to be handled despite the low mechanical properties. Thus, thick grids can be cooled to room temperature more slowly than thinner grids. They may be able to be handled in pasting with lower hardness than thinner grids.

The mechanical properties of lead-calcium grid alloys are dependent not only on the temperature but also on the rate of aging after cooling to room temperature. The rate of aging is much more important in thin grids than thick grids.

During the past ten years, lead-calcium-based alloys have replaced lead-antimony alloys as the materials of choice for positive grids of both automobile and stationary lead-acid batteries. Lead-antimony alloys corrode more rapidly than lead-calcium alloys, antimony is released by grids during corrosion, and during the recharge process antimony is transferred to the negative plate where it causes unacceptable loss of water from the electrolyte, particularly in areas of high heat. Lead-calcium alloys do not suffer the water loss during service and, thus, can be processed into grids for maintenance or sealed lead-acid batteries.

Lead-calcium alloys have a very low freezing range and are capable of being processed into positive and negative grids by a variety of grid manufacturing processes, such as conventional book mold casting, rolling and expanding, continuously casting followed by expansion or punching, continuous grid casting, and continuous grid casting followed by rolling. The continuous grid manufacturing processes decrease battery grid and plate production costs.

About ten years ago, the automobile manufacturers modified the exterior of the vehicles to make them more aerodynamic. This design change caused considerably less air to flow through the engine compartment, considerably increasing the underhood temperature.

At that time, lead-calcium alloys were used that generally contained relatively high calcium content (0.08% or higher) and relatively low tin content (0.35–0.5%). Positive grids produced from these alloys hardened rapidly and could be handled and pasted into plates easily. The addition of aluminum to the lead calcium alloys and the method of manufacturing these alloys dramatically reduced calcium oxide generation during processing and permitted production of grids with much better control of the calcium content.

These alloys contained $Pb_3Ca$. The higher underhood heat environment leads to increased corrosion of the positive grids in these alloys due to the presence of this $Pb_3Ca$ in the alloy and failure of the batteries due to corrosion and growth of the positive grids. New lead-calcium alloys were developed to address these problems. They are described in U.S. Pat. Nos. 5,298,350, 5,434,025, 5,691,087, 5,834,141, 5,874,186, as well as DE 2,758,940. These alloys contain much lower calcium than previous alloys because lower calcium produces lower corrosion rates.

Silver has been added to lead and lead alloys for many years to reduce the corrosion of the lead alloy when used as an anode or positive grid of a battery. Rao et al. in U.S. Pat. No. 4,456,579, Nijhawan in U.S. Pat. No. 3,990,893, and Geiss in U.S. Pat. No. 4,092,462 describe lead-antimony alloys for battery grids containing silver as an additive to reduce grid corrosion. The lead-calcium alloys referred to above also contain silver, which further reduces the rate of corrosion, and contain sufficient tin to react with virtually all the calcium to form stable $Sn_3Ca$. The grids produced from the lead-calcium-tin-silver alloys have very high resistance to corrosion and growth of the positive grids during testing and in vehicle use, particularly at elevated temperatures.

Rao describes a lead-calcium-tin-silver alloy for positive automobile battery grids in U.S. Pat. No. 5,298,350 which contains 0.025–0.06% calcium, 0.3–0.7% tin, 0.015–0.045% silver, and may contain 0.008–0.012% aluminum. Further refinements of the alloy for direct cast strip are taught in Rao et al. in U.S. Pat. No. 5,434,025 where the calcium range is reduced to 0.02–0.05%, the tin content reduced to 0.3–0.5%, and the silver range increased to 0.02–0.05%. This patent also teaches utilizing strontium or mixed calcium/strontium as a replacement for the calcium. Rao et al. also teach in U.S. Pat. No. 5,691,087 the use of lead-calcium-tin-silver alloys for positive plates of sealed batteries with a composition of 0.025–0.06% calcium, 0.3–0.9% tin, and 0.015–0.045% silver. Rao et al. further refine the lead-calcium-tin-silver alloys for positive grids using the same calcium content ranges described above, but with higher tin contents and a lower level for the silver content based on the methods of grid production. In U.S. Pat. No. 5,874,186, Rao et al. teach an alloy having 0.03–0.05% calcium, 0.65–1.25% tin and 0.018–0.030% silver.

Anderson et al. in U.S. Pat. No. 5,834,141 describe a wider calcium range 0.035–0.085%, higher tin content 1.2–1.55%, and lower silver content 0.002–0.035% range than the patents of Rao and Rao et al. According to Anderson et al., the composition must be varied depending on the method of grid manufacture. If the alloy is to be book mold cast, the alloy must include aluminum and have 0.035–0.055% calcium, 1.2–1.55% tin, 0.025–0.035% silver and 0.005% aluminum. In contrast, a grid formed by the expanded metal process must contain 0.045–0.085% calcium, 1.2–1.55% tin and 0.002–0.0049% silver.

Larsen describes a method of producing directly cast strip of at least 0.060" thickness from lead-calcium-tin-silver alloys in U.S. Pat. No. 5,948,566. Larsen's alloy contains 0.01–0.06% calcium, 0.03–1.0% tin, 0.01–0.06% silver and optionally 0.003–0.01% aluminum. Assmann describes similar alloys in German patent DE 2758940 with a calcium content of 0.02–0.1%, a tin content of 0.44–1.90%, and a silver content of 0.02–0.1%. Yasuda et al in U.S. Pat. No. 4,939,051 describes the use of a foil of lead-silver-tin pressure bonded to a rolled sheet for a grid production process by expansion. Reif et al. in U.S. Pat. No. 4,725,404 describes the use of copper and/or sulfur to modify the grain structure of lead-calcium (tin) alloys. Finally, Knauer in U.S. Pat. No. 6,114,067 describes a lead alloy containing about 0.06–0.08% calcium, 0.3–0.6% tin, 0.01–0.04% silver and 0.01–0.04% copper which strengthens relatively quickly and can be used in batteries.

The grids produced from these alloys, however, are not without problems. The very low calcium contents (0.02–0.05%) generally utilized in the grid alloys produce grids which are very soft, difficult to handle, and harden very slowly. To utilize grids produced from these alloys, the cast material must be stored at room temperature for long periods of time or artificially aged at elevated temperatures to bring the material to sufficiently high mechanical properties to be handled in a pasting or expander/paster machine. On the other hand, calcium levels above 0.082% can result in formation of $Pb_3Ca$ rather than $Sn_3Ca$.

Battery grids produced from the lower calcium/high silver-tin alloys are extremely corrosion-resistant. However, in order to be made into a battery plate, a grid must be pasted with a mixture of leady lead oxide, sulfuric acid, water and some additives. After pasting, the plates are cured to permit the paste (active material of the battery) to firmly attach itself to the battery grid. This permits good electrical contact between the grid and the active material.

During curing the grids are corroded to permit the paste to adhere to the grid. Battery manufacturers must now go to great lengths to corrode the very corrosion-resistant grids. These include treating the grids for long periods of time in hot steam environments to produce a corrosion film on the grid surface; treating the surface of the grids with alkaline reagents, peroxides, or persulfates; or long curing times at high temperature and humidity for as long as five days. In every production method, the failure mechanism of the battery is now generally active material disengagement from the positive grid rather than positive grid corrosion.

An additional problem for the above alloys is the relatively low tin content of 0.3–0.6%. Low tin contents permit the formation of non-conductive oxide layers between the grid and active material when the battery becomes discharged. The resistance of these oxide products may prevent adequate charge acceptance during recharge of the battery if it becomes discharged, thus resulting in premature failure.

The silver added to these alloys enters the recycled lead stream when the batteries are recycled. While some silver may be utilized by recycling back into the battery grid alloys, the silver may need to be removed to lower levels in the lead used for the active material of the batteries, particularly for sealed service. This leads to additional costs for battery recycling.

It is the object of this invention to provide a lead alloy which can be utilized in the production of the positive grids of lead acid batteries which can withstand the high temperature corrosion of the underhood environment of the automobile.

Another object is to produce thin grids by any method desired (continuously cast-expansion or punched, roll-expansion, continuously cast, continuously cast-rolled, or conventional book mold casting) using an improved alloy which will harden rapidly so that the grid can be utilized in a short period of time after production without excessively long aging time or artificial aging.

A further object of the invention is to increase the ability of paste to adhere to the grid surface during curing so that no extraordinary measures such as steaming or long curing times are required to produce a good grid/active material bond.

Still another object of the invention is to improve the charge acceptance of the battery produced with the improved grid alloy so that it can be adequately recharged if the battery becomes discharged.

Another object of the invention is to permit recycling of the batteries produced using the alloy more easily and at lower costs by reducing the silver content.

A further object is to increase the creep resistance and mechanical properties of the battery grid alloys so that the grids can better resist the effects of elevated temperatures without additional silver.

Other advantages of the grids are the improved stability of the grain structure resulting in reduced corrosion and the improved retention of the mechanical properties and active material at elevated temperatures.

SUMMARY OF THE INVENTION

This invention provides a lead acid battery grid produced from a lead alloy which contains calcium in an amount above 0.060 and below 0.082%, tin above 1.0 and below 1.2%, silver between 0.005 and 0.020%. The alloy may optionally further contain between 0.002 and 0.030% aluminum. In an alternative embodiment, the alloy contains between 0.005% and 0.05% copper in place of some of the silver, provided, however, the silver is never less than 0.005%.

DETAILED DESCRIPTION OF THE INVENTION

The invention provides a thin lead acid battery grid produced from a lead alloy which contains calcium in an amount greater than 0.060 and below 0.082%, tin in an amount greater than 1.0% and less than 1.2%, silver between 0.005 and 0.020%, and aluminum between 0.00% and 0.03%. More preferably, the battery grid contains calcium in an amount from 0.065 to 0.075%, silver in an amount from 0.012 to 0.018% and, optionally, aluminum in an amount between 0.002 and 0.030%, most preferably between 0.005 and 0.015%. The battery grid may contain 0.005 to 0.05% copper in place of some of the silver, provided that the silver level is always at least 0.005% and that no more than a trace of aluminum is present. The battery grid may also contain trace amounts of many materials, such as sulfur, nickel, antimony and arsenic. "Trace amounts" typically refers to amounts below 0.001%. The grid may also contain small amounts of other impurities, such as bismuth, found in recycled lead. Strontium or barium in amounts not exceeding 0.05% may also be present.

The present invention is based on the development of an alloy for the positive grids of both starting-lighting and ignition (automobile) batteries as well as sealed batteries using gel, absorbed glass mat (AGM), granular silica, or high silica glass or polymeric separators. The alloy is suitable for strip casting or book molding of thin grids. As used herein, "thin grids" refers to grids that are less than 0.060 inches thick.

The alloy contains more than 0.060% and less than 0.082% calcium. It has been found that alloys of lead-calcium-tin containing lower levels of calcium, such as the 0.02–0.05% taught in many of the cited patents, have significantly lower mechanical properties than alloys containing greater than 0.06% calcium, particularly when utilizing low tin contents.

Grids produced from the calcium alloys having slightly lower calcium levels take a very long time to harden, making them particularly unsuitable for thin grids. In contrast, alloys containing greater than 0.06% calcium harden rapidly. Very low calcium content alloys may not completely harden even after 120 days of aging.

The present invention utilizes a tin content greater than 1.0% and below 1.2%. At these tin contents, high mechanical properties are reached for the 0.060–0.082% calcium alloys, particularly yield strength and creep rate, which are factors in the stability of the grids. The creep rate is enhanced by the addition of small amounts of silver.

The higher tin content of the grid reduces the rate of corrosion of the higher calcium-containing alloy. The tin also dopes the corrosion product on the surface of the positive grid, making it more conductive. Tin at levels above 1.0% and below 1.2% also reduce the formation of tetragonal PbO at the grid active material interface and reduce polarization during recharge. Tetragonal PbO is an insulator and may be a significant factor in reduced rechargability of batteries containing lower amounts of tin in the positive grids.

Batteries containing low tin content in the positive grids may suffer from production of $PbSO_4$ or tetragonal PbO at the grid/active material interface when deeply discharged. These products can act as insulators which inhibit recharge except at very high potentials. The alternators used in automobiles may not produce a voltage sufficiently high enough to permit adequate recharge of the battery when it becomes discharged. The higher tin content of the invention virtually eliminates the formation of these resistive layers at the surface of the positive grid. Higher tin contents above 1.2% have little additional beneficial effects on the recharge, but add higher cost to the battery.

The tin contents above 1.0% and below 1.2% significantly reduce the rate of corrosion of the alloys. At any calcium content, Prengaman in *The Metallurgy and Performance of Cast and Rolled Lead Alloys for Battery Grids*, Journal of Power Sources, 67 (1997) 267–278, has shown that the corrosion rates are not significantly reduced using tin contents above about 1%. At the same time, corrosion of alloys containing tin at about the 1% level and calcium contents of 0.06–0.08% have similar or lower corrosion rates in acid media than lower calcium alloys (0.050%) containing lower tin contents. Thus, for practical purposes in service, the higher tin content of the proposed alloys may be responsible for the low corrosion rates observed with the lower calcium content alloys taught in other patents.

Higher calcium contents will, however, make the surface of the battery grid significantly more alkaline when contacted by the wet paste mixture of the active material than lower calcium-content grid materials. The grid must be corroded to permit the active material paste to adhere to the surface. Lead and lead alloys are corroded more rapidly by alkaline solutions. Higher calcium contents in battery grids produce more alkaline conditions on the grid surface when contacted by the water in the paste mixture. This permits the grid surface to be attacked slightly to form PbO or basic lead sulfates which bonds the active material paste to the grid during the curing process. The higher the calcium content of the grid, the more alkaline the grid surface becomes and the easier is the attachment of the active material to the grid surface. The beneficial effects of the higher alkaline corrosion for attachment of the active material have been offset by the higher corrosion rates of lead-calcium alloys in the past containing relatively low amounts of tin as are described previously. Additional tin, however, reduces the rate of corrosion.

Tin alone is not sufficient to prevent degradation of the lead acid battery grids in high temperature service. At elevated temperatures, the large grain structures produced in these alloys are subject to selective corrosion at the grain boundaries, resulting in reduced battery grid life.

Small amounts of silver added to the grid reduce the rate of corrosion but also significantly reduce the rate of penetration of the corrosion processes into these grain boundaries. This enables the high tin containing materials to resist growth of the battery grid and maintain the integrity of the grid during service. Silver contents of as low as 50 ppm (0.0050%) have been shown to have a beneficial effect in reducing the rate of corrosion and growth of battery grids in service. Silver contents between 100 and 200 ppm (0.010% and 0.020%) significantly decrease the rate of grid growth and corrosion during service without making the battery grid too corrosion-resistant for good bonds between the grid and the active material during curing.

Silver added in an amount of less than 200 ppm will permit the batteries to be recycled into pure lead and lead alloys which contain silver contents within the normal silver content of most battery raw material and alloy specifications. Batteries with the silver content of the invention can be recycled without the need for expensive refining treatments to remove the silver which may be required with batteries utilizing higher silver contents.

The alloy for the lead acid battery grids may be further modified by replacing some of the silver in the battery grid alloy with copper. Alloys of lead-copper which contain silver in amounts less than 200 ppm (0.02%) have been used to produce lead products with reduced corrosion rates for use in chemical reactors in contact with $H_2SO_4$ at elevated temperatures. Copper is also easily removed in the normal refining processes for lead, thus improving the ability for the batteries using these alloys to be recycled. Compared to the current battery grid (low calcium, low tin and high silver) alloys, the lead-copper-silver-calcium-tin alloy may offer substantial benefits in recycling the batteries which use the alloy for positive grids.

Table I below shows the aging behavior in terms of hardness at room temperature of several alloys which is indicative of the vast difference in strengthening of the grids. The hardness measurements are made on cast plates using the Rockwell "R" scale which is ½" D ball with an applied load of 30 kg for 15 seconds.

Sample 1 represents low calcium, low tin, silver-containing alloy composition of the normal corrosion-resistant grids representative of U.S. Pat. No. 5,298,350 by Rao, U.S. Pat. No. 5,434,025 by Rao et al., U.S. Pat. No. 5,691,087 by Rao et al. and Larsen et al. in U.S. Pat. No. 5,948,566. These grid alloys have a low calcium content and relatively low tin content as seen in Sample 1. The alloys are extremely weak when first cast and do not harden sufficiently for further processing even within 14 days. A Rockwell "R" hardness of about 65 is required to process the cast grids or grid precursor material such as concast strip through the pasting process.

Sample 2 represents a calcium content outside the preferred range of the above patents of about 0.03–0.05% and tin at the highest range of the Larsen patent and above the range of the other patents. The alloy composition has much higher initial mechanical properties than the 0.045% calcium alloys of Sample 1. After one week of aging at room temperature, however, this material still does not reach the required hardness level for further processing.

Sample 3 represents a material at the highest calcium and tin limits of the Larsen patent. Even this material does not reach acceptable hardness levels within one week. The thick material (>0.060" thick) taught by Larsen may be able to be handled in one week. Thin grids produced from this material would not be able to be processed within seven days. Thin grids produced from Samples 1, 2 or 3 would still have processing problems even after seven days of aging and would require longer aging times or artificial heat treatment to produce the required hardness level.

Lead alloys with calcium contents above 0.060% calcium and tin contents above 1.00% of this invention (seen in sample 4) produce grids which are markedly stronger at any aging time than the alloys of samples 1, 2 and 3 taught by the referenced patents and other low calcium alloy systems.

Sample 4 is much harder than materials with only slightly lower calcium and tin contents (seen in samples 2 and 3). Not only is the initial hardness higher, which makes freshly cast grids easier to handle, but the grids can be processed after aging for only 24 hours and certainly after 48 hours. Higher tin contents (sample 5) or calcium contents (sample 6) taught by this invention produce even faster aging and higher initial hardness than Sample 4. In these materials cast grids could be processed within 24 hours of production, which significantly reduces inventory in the factory.

TABLE I

Hardness of Various Lead-Calcium-Tin-Silver Positive Grid Alloys as a Function of Time Hardness (Rockwell "R")

| Sample | Grid Alloy Composition | | | Aging Time Hours (Days) | | | | | |
|---|---|---|---|---|---|---|---|---|---|
| | Ca | Sn | Ag | ½ | 4 | 24(1) | 48(2) | 168 (7) | 336(14) |
| 1 | 0.045 | 0.70 | .030 | −30 | −25 | −20 | 0 | 45 | 60 |
| 2 | 0.055 | 1.00 | .020 | 26 | 33 | 46 | 53 | 63 | 68 |
| 3 | 0.060 | 1.00 | .020 | 32 | 47 | 53 | 57 | 64 | 70 |
| 4 | 0.062 | 1.05 | .018 | 41 | 56 | 66 | 68 | 74 | 77 |
| 5 | 0.063 | 1.15 | .018 | 43 | 59 | 70 | 73 | 77 | 80 |
| 6 | 0.076 | 1.06 | .018 | 50 | 60 | 70 | 72 | 75 | 80 |

Thin grids must have higher hardness than thicker grids to be processed. The higher calcium content above 0.060% and tin content above 1.0% are believed to rapidly combine to form strengthening precipitates. A threshold for more rapid initial hardening as well as rapid age hardening is shown by this data to exist above 0.060% calcium as seen from Sample 3 vs. Sample 4 in Table 1. Tin contents in excess of 1.1% produce more rapid aging as seen in Sample 5, while higher calcium contents produce higher initial hardnesses as seen in Sample 6.

The calcium content of the grids is restricted to levels below about 0.082% calcium. At levels above 0.082% calcium, primary $Pb_3Ca$ particles may be formed in the melt which may interfere with the flow of metal into the grid mold as well as the solidification process.

Tin content is restricted to less than 1.2% due to cost reasons and to the potential for cracking during processing due to formation of a silver-tin-lead eutectic. Thus, the positive grid of the invention consists of a calcium content greater than about 0.06% calcium but less than 0.082% calcium, a tin content greater than 1.0% tin but less than 1.2% tin, and a silver content of greater than 0.005% silver to less than 0.02% silver. Aluminum may be added to the alloy in an amount higher than 0.002% but less than 0.030% to prevent loss of calcium due to oxidation depending on the grid manufacturing process.

Due to the nature of the solidification process of lead calcium alloys, the grain boundaries of the cast grids are deficient of calcium compared to the bulk alloy. If the calcium content is kept in a range greater than 0.06% but less than 0.082% as taught by this invention, the calcium content will be more uniform throughout the grid. This can produce stronger initial castings and more uniform properties throughout the grid than grids using alloys with lower calcium contents. The more uniform properties facilitate use of this alloy in manufacturing methods, particularly in the continuous strip casting methods, where any nonuniformity raises the potential for cracking or stretching.

The preferred positive grid alloy contains a calcium content greater than 0.065% but less than 0.080% such as 0.075%, a tin content greater than 1.05% but less than 1.2% such as 1.15%, a silver content greater than 0.010% but less than 0.020% such as 0.017%. Aluminum can be added in amounts of 0.006% to 0.020% depending on the grid production process.

Copper added to the lead-calcium-tin-silver positive grid alloy further enhances the initial hardness of the grid alloy and further reduces the time required to reach sufficient mechanical properties for processing in pasting and handling. Preferably copper is added in an amount between 0.005% and 0.05%, most preferably between 0.010 and 0.03%. When copper is present, no more than trace amounts of aluminum should be present.

Table II shows the effects of copper additions on the aging response of several copper-containing alloys covered by this invention. The results are compared to Sample 4 from Table I which does not contain copper as an alloying element.

TABLE II

Hardness of Various Lead-Calcium-Tin-Silver Positive Grid Alloys as a Function of Time Hardness (Rockwell "R")

| Sample | Grid Alloy Composition | | | | Aging Time Hours (Days) | | | | | |
|---|---|---|---|---|---|---|---|---|---|---|
| | Ca | Sn | Ag | Cu | ½ | 4 | 24(1) | 48(2) | 168(7) | 336(14) |
| 4 | 0.062 | 1.05 | 0.018 | 0.0003 | 41 | 56 | 66 | 68 | 74 | 77 |
| 7 | 0.063 | 1.04 | 0.012 | 0.020 | 57 | 67 | 76 | 78 | 80 | 82 |
| 8 | 0.064 | 1.05 | 0.006 | 0.025 | 52 | 66 | 73 | 75 | 76 | 80 |
| 9 | 0.080 | 1.04 | 0.012 | 0.011 | 65 | 75 | 79 | 80 | 81 | 82 |

As seen in Sample 7 in Table II, the addition of a small amount of copper (0.02%) to the alloy, while at the same time reducing the silver content, greatly increases not only the initial hardness of the casting but also dramatically increases the rate of hardening of the alloy. As seen in sample 8, further reducing the silver content to levels of 0.006% but using a slightly higher copper content 0.025%, the mechanical properties of the alloys are nearly the same. In Sample 9, combining the silver content of Sample 7 with higher calcium content results in dramatically higher initial hardness and hardening rate.

Battery grids produced from the lead-calcium-tin-silver-copper alloys of this invention are ready for pasting in as little as four hours, and certainly in 24 hours, compared to over seven days for corrosion-resistant alloys without copper of the referenced patents. Thinner grids can be easily handled due to the extremely high initial hardness of the copper-containing alloys.

A battery containing a lower silver level but moderate copper content in the positive grid is much easier to recycle than alloys containing higher silver contents.

The copper-containing battery grid alloy should have a calcium content greater than 0.06% but less than 0.082%, a tin content greater than 1.0% but less than 1.2%, a silver content greater than 0.005% but less than 0.020%, and a copper content greater than 0.005% but less than 0.050%.

The preferred alloy would contain 0.065 to 0.077% calcium, 1.1 to 1.15% tin, 0.005 to 0.015% silver, and 0.015 to 0.030% copper.

The alloys of the invention are workable in 48 hours, with the preferred alloys workable in 24 hours. The alloys may be formed into battery grids by any conventional production method referred to in the prior art discussion, including book molding and continuous strip casting processes. Preferably, the grids are formed by a process which results in a thickness of less than 0.06 inches.

The preferred alloy of the invention has been shown to have excellent properties in tests. Specifically, in the SAE J240B Cycle tests for failure in underhood conditions, a battery using the alloy of the invention that had been strip cast and expanded survived through greater than 4500 cycles.

Thus, the invention provides an improved alloy which can be used to rapidly manufacture thin grids using any manufacturing method. The invention also provides an improved method of manufacturing a grid and a grid having improved durability.

I claim:

1. A cast battery grid comprising a cast alloy containing greater than 0.60 weight % to less than 0.082 weight % calcium distributed relatively uniformly throughout the grain boundaries and the bulk alloy, greater than 1.0% weight % to less than 1.2 weight % tin and 0.005 weight % to 0.020 weight % silver.

2. The battery grid of claim 1 in which the alloy contains 0.065 to 0.075 weight % calcium.

3. The battery grid of claim 1 in which the alloy contains 0.012 to 0.018 weight % silver.

4. The batten grid of claim 1 in which the alloy contains 0.002 to 0.030 weight % aluminum.

5. The battery grid of claim 1 in which the alloy contains 0.005 to 0.015 weight % aluminum.

6. The battery grid of claim 1 in which the alloy contains no more than trace amounts of aluminum and further comprising 0.005 to 0.05 weight % copper.

7. The battery grid of claim 1 in which the alloy contains greater than 1.05 weight % tin.

8. The batten grid of claim 1 in which the alloy contains 0.065 to 0.077 weight % calcium, 1.1 to 1.15 weight % tin and 0.005 to 0.015 weight % silver.

9. The battery grid of claim 8 in which the alloy contains 0.015 to 0.030 weight % copper.

10. A cast lead acid battery grid comprising an alloy containing greater than 0.060 weight % to less than 0.082 weight % calcium, greater than 1.0% weight % to less than 1.2 weight % tin and 0.005 weight % to 0.020 weight % silver.

11. The battery grid of claim 10 wherein the calcium is present in an amount from 0.065 to 0.05 weight %.

12. The battery grid of claim 10 wherein the silver is present in an amount from 0.012 to 0.08 weight %.

13. The battery grid of claim 10 wherein aluminum is present in an amount between 0.002 and 0.030 weight %.

14. A lead acid battery grid containing the lead alloy of claim 6.

15. The battery grid of claim 10 having a thickness less than 0.06 inches.

16. The battery grid of claim 10 formed by continuous strip casting and then shaping into a grid shape.

* * * * *

UNITED STATES PATENT AND TRADEMARK OFFICE
CERTIFICATE OF CORRECTION

PATENT NO. : 6,649,306 B2
DATED : November 18, 2003
INVENTOR(S) : R. David Prengaman It is certified that error appears in the above-identified patent and that said Letters Patent is hereby corrected as shown below:

<u>Column 10,</u>
Line 18, "0.60" should read -- 0.060 --.
Line 36, "batten" should read -- battery --.
Line 48, "0.05" should read -- 0.075 --.
Line 50, "0.08" should read -- 0.018 --.

Signed and Sealed this

Twenty-third Day of March, 2004

JON W. DUDAS
*Acting Director of the United States Patent and Trademark Office*